United States Patent [15] 3,652,295
Rogols et al. [45] Mar. 28, 1972

[54] FERMENTABLE STARCH COMPOSITIONS

[72] Inventors: Saul Rogols, Circleville; Robert L. High, Canal Winchester, both of Ohio

[73] Assignee: A. E. Staley Manufacturing Company

[22] Filed: Nov. 6, 1968

[21] Appl. No.: 773,956

[52] U.S. Cl. ................................................99/91, 195/32
[51] Int. Cl. .....................A21d 2/36, A21d 2/04, C12b 3/06
[58] Field of Search ...................................99/91, 90; 195/32

[56] References Cited

UNITED STATES PATENTS 3,108,878   10/1963   Higashiuchi et al. ..................99/91 X
3,167,432   1/1965    Colby .....................................99/91 X
3,488,256   1/1970    High et al. ..................................195/7

Primary Examiner—Raymond N. Jones
Assistant Examiner—James R. Hoffman
Attorney—Charles Meyerson and James V. Sheridan

[57] ABSTRACT

A lipase-altered starch is included in a carbohydrate composition such as a sponge-dough mix to influence favorably the fermentation of such mixes. The lipase-altered starch has a higher fermentation rate than unaltered starch; which rate, in the case of wheat starch, can be further increased by the addition of a calcium salt. The lipase-altered starch has a synergistic effect on fermentation when combined with ammonium persulfate; changes the nature of the sugar material present following fermentation; and, particularly with added ammonium persulfate, improves the grain and texture of bread.

14 Claims, No Drawings

FERMENTABLE STARCH COMPOSITIONS

BACKGROUND OF THE INVENTION

In a copending application Ser. No. 542,502 filed Apr. 16, 1966 now U.S. Pat. No. 3,488,256 we disclosed a method for altering starch molecules by effecting an enzymic reaction between starch and an atypical enzyme. An atypical enzyme, in this context, is an enzyme having specific activity toward a noncarbohydrate, or atypical, fragment of the starch molecule. Thus, lipid fragments occur in the starch molecule and, thus, the activity of the starch can be altered by enzymic reaction with a lipase. For example; such lipase-altered starches, and particularly steapsin-altered starches, exhibit marked differences in their speed, extent, and products of hydrolysis, acidic or enzymic, as compared to the unaltered starch.

There is a need to improve other reactions involving carbohydrates. One such reaction is yeast fermentation; in breadmaking, for example; where the rate of carbon dioxide production and the nature of the final sugar constituents can be very important to the rate at which a product is made and to the quality of the product.

OBJECTS

It is, therefore, an object of the invention to provide an improved, carbohydrate-containing composition with increased susceptibility to fermentation.

It is a further object to improve the quality of baked goods.

It is a further object to reduce the proportion of glucose and increase the proportion of maltose and similar low molecular weight polysaccharides formed in the fermentation of carbohydrate compositions.

It is a specific object to include ammonium persulfate and a lipase-altered starch in a sponge dough.

SUMMARY OF THE INVENTION

We have now found that the foregoing and related objects can be attained in a composition comprising carbohydrate and a suitable carbohydrate fermenting, carbon dioxide producing organism wherein the improvement comprises a lipase-altered starch as a constituent of said composition.

In the making of bread, for example, a typical carbohydrate composition comprises about 96 percent wheat flour and about 4 percent sugar. To this we add a small percentage; usually up to about 10 percent, but preferably about 3–6 percent; of a lipase-altered starch.

The fermentation reactions, per se, are not novel. These are carried out in the usual manner, with the usual fermentation organisms, with the usual nutrients for the organisms, at the usual temperatures, etc. Similarly, the carbohydrates involved in prior art processes, such as the flour and sugar of pastry doughs, are most often used in the composition and method of the invention except that a lipase-altered starch is added to, or partially substitutes for, such well known carbohydrates. The lipase-altered starch, as contrasted with unaltered starch, has sufficient "gassing power" in fermentation reactions to qualify it for use in bread making, for example.

We have found further that the gassing power, or fermentation rate, of lipase-altered wheat starch can be increased by adding a small percentage; e.g., about 1–5 percent of the starch weight; of a calcium salt to the altered starch. We have found also that ammonium persulfate; e.g., about 10 percent of the starch weight; added to the altered starch contributes to the grain and texture of bread products. The latter also contributes to a change in the nature of the sugar materials present following fermentation. Thus, as shown in Table 4, the milligrams of glucose (monosaccharide) formed per gram of sample (as compared to low molecular weight polysaccharides such as maltose) can vary from 0.00 to 1.41 depending on the salts added and on whether the starch has been lipase-altered.

EXAMPLE 1

A standard steapsin solution was prepared by dispersing 0.05 grams of the enzyme in a calcium buffer at a pH of 7.4 and consisting of 0.0075 M calcium phosphate/calcium acetate.

A wheat starch slurry was adjusted to pH 8.0 and 0.05 percent hydrogen peroxide was added to destroy residual $SO_2$ in the starch. After 30 minutes the pH was adjusted to 6.80. Calcium chloride (0.5 percent) was added from a solution thereof. The resulting was allowed to stand for 1 hour; at which time steapsin (from the above preparation) was added at the 0.004 percent level. The mixture was allowed to react for 5 hours. The solution was again adjusted to a pH of 6.80. Calcium chloride (2 percent) was added and the mixture was allowed to stand for 1 hour. The lipase-altered starch was then filtered out, washed with distilled water, and dried. The "gassing power" of this starch (Test Starch 1) when fermented is shown in Table 1. A sample of altered corn starch was prepared in the same manner as described above and its gassing power is shown also in Table 1. Various controls and modifications are included in Table 1 for comparison. Now referring to Table 1;

Control 1 is unaltered starch with no additions.

Control 2 is unaltered starch plus the calcium salts.

Test starch 2 is steapsin-altered starch with no added calcium salts other than those in the steapsin preparation, Test starch 3 is steapsin-altered starch with no calcium salts added at any point.

It will be noted in Table 1 that the steapsin-altered starches, with or without added calcium salt, had a greater gassing power than the controls.

TABLE 1

|  | $CO_2$ produced in mm. Hg. Hours | | | | |
|---|---|---|---|---|---|
|  | 1 | 2 | 3 4 | 5 | 6 |
| Wheat Starch |  |  |  |  |  |
| Control No. 1 |  | 2 | 3   5 | 7 | 8 |
| Control No. 2 | 5 | 7 | 13 17 | 20 | 23 |
| Test Starch No. 1 | 20 | 29 | 67 87 | 97 | 119 |
| Test Starch No. 2 | 7 | 26 | 43 53 | 62 | 67 |
| Test Starch No. 3 | 18 | 41 | 58 69 | 77 | 81 |
| Corn Starch |  |  |  |  |  |
| Control No. 1 | 0 | 1 | 3   3 | 3 | 4 |
| Control No. 2 | 1 | 3 | 4   7 | 9 | 10 |
| Test Starch No. 1 | 2 | 4 | 5   7 | 11 | 12 |
| Test Starch No. 2 | 8 | 10 | 17 23 | 25 | 30 |
| Test Starch No. 3 | 8 | 10 | 15 19 | 20 | 21 |

EXAMPLE 2

Steapsin-altered wheat starches and suitable controls were prepared as described in Example 1 with the following differences:

Test starch No. 4
No steapsin. Calcium sulfate (1 percent) and ammonium persulfate (2 percent) added.

Test starch No. 5
Ammonium persulfate (2 percent) added to enzymic reaction.

Test starch No. 6
Calcium sulfate (1 percent) added with steapsin. Ammonium persulfate (2 percent) added after enzymic reaction.

Test starch No. 7
Calcium sulfate (5 percent) added to enzymic reaction and ammonium persulfate (2 percent) added after enzymic reaction.

Test starch No. 8
No calcium salts added. Ammonium persulfate (2 percent) added after enzymic reaction.

The above starches (30 gram samples) were fermented and the gas developed is shown in Table 2. It may be noted that steapsin treatment followed by the addition of 2 percent ammonium persulfate (Samples Nos. 5, 6, 7 and 8) is superior to either steapsin alone (No. 1) or salts alone (No. 4).

TABLE 2

| | $CO_2$ produced in mm. Hg. Hours | | | | | |
|---|---|---|---|---|---|---|
| | 1 | 2 | 3 | 4 | 5 | 6 |
| Unaltered Wheat Starch | 9 | 14 | 16 | 18 | 21 | 26 |
| Wheat Test Starch 1 | 21 | 67 | 105 | 139 | 166 | 189 |
| Wheat Test Starch 4 | 59 | 142 | 166 | 172 | 183 | 188 |
| Wheat Test Starch 5 | 65 | 184 | 210 | 216 | 227 | 232 |
| Wheat Test Starch 6 | 45 | 149 | 205 | 234 | 250 | 261 |
| Wheat Test Starch 7 | 51 | 208 | 262 | 277 | 297 | 312 |
| Wheat Test Starch 8 | 61 | 203 | 258 | 287 | 315 | 340 |

EXAMPLE 3

A sponge-dough bake was made as follows: The sponge was made up of 60 pounds of patent flour, 3 pounds of yeast, and 0.5 pound of yeast food. The sponge mix time was 3 minutes at 80° F. and the sponge time was 4 hours at 86° F.

The dough was made up of 40 pounds of patent flour, 3 pounds of shortening, 2 pounds of salt, 3 pounds of milk, and 4 pounds of sugar. The mix time was 12 minutes at 83° F. The flour time was 30 minutes and the proof time overhead was 15 minutes. The overall time was 4.75 hours and the scaling weight was 18 ounces. Comparable bakes were made with the addition of 3 percent, 6 percent and 9 percent, respectively, of the various control and test starches described in the previous Examples. A comparison was made of the finished loaves. Comparison of crust color, break and shred, crumb color, aroma and taste, and softness were made but are not reported because, in all cases, the bakes including the test starches were not significantly different from the control bakes without starch. In the case of volume comparison test, however, starches 5, 6, 7, and 8 gave superior results and, therefore volume results are reported. The effect of the added test starches of the invention on grain and texture was particularly noteworthy and results were given for these characteristics in Table 3.

TABLE 3

| | Volume | Grain | Texture |
|---|---|---|---|
| Perfect score | 10 | 20 | 20 |
| Control - no starch | 9 | 16 | 17 |
| Unaltered starch —3% | 9 | 18 | 18 |
| Unaltered starch —6% | 9 | 17 | 18 |
| Unaltered starch —9% | 8 | 17 | 17 |
| Wheat test starch 4—3% | 9 | 18 | 18 |
| Wheat test starch 4—6% | 9 | 17 | 17 |
| Wheat test starch 4—9% | 7 | 17 | 17 |
| Wheat test starch 5—3% | 10 | 18 | 18 |
| Wheat test starch 5—6% | 10 | 17 | 17 |
| Wheat test starch 5—9% | 9 | 16 | 16 |
| Wheat test starch 6—3% | 10 | 17 | 18 |
| Wheat test starch 6—6% | 9 | 17 | 17 |
| Wheat test starch 6—9% | 8 | 16 | 16 |
| Wheat test starch 7—3% | 10 | 17 | 17 |
| Wheat test starch 7—6% | 10 | 17 | 17 |
| Wheat test starch 7—9% | 9 | 16 | 16 |
| Wheat test starch 7—3% | 10 | 17 | 18 |
| Wheat test starch 8—6% | 9 | 17 | 18 |
| Wheat test starch 8—9% | 8 | 17 | 18 |

EXAMPLE 4

The test starches of Example 2, following fermentation, were analyzed by the Glucostat technique to determine the nature of the carbohydrate end product. Specifically the milligrams of glucose per gram of sample were determined. The latter results and the carbon dioxide production in the 6th hour of fermentation are recorded in Table 4. It may be noted that the lipase treatment followed by addition of ammonium persulfate tends to reduce the proportion of glucose in the product. The latter products, however, had relatively more maltose.

TABLE 4

| | $CO_2$ (6 hrs.) (mm. Hg.) | mg. glucose per gram sample |
|---|---|---|
| Unaltered Wheat starch | 26 | 0.06 |
| Wheat test starch 4 | 188 | 1.41 |
| Wheat test starch 5 | 232 | 1.34 |
| Wheat test starch 6 | 261 | 1.31 |
| Wheat test starch 7 | 312 | 0.59 |
| Wheat test starch 8 | 340 | 0.00 |

Example 5

That, in certain compositions, the combined lipase treatment of wheat starch followed by an ammonium persulfate addition can be synergistic with respect to gassing power is shown in Table 5. In each case the calcium sulfate was added prior to the steapsin reaction and the ammonium persulfate was added following the steapsin reaction. When ammonium persulfate was added, the mixture was permitted to stand for 1 hour before filtering and drying the product. The steapsin level was 0.004 percent and all percentages are based on the starch weight.

TABLE 5

| Added to starch | mm. Hg 6 hrs. | Protein, percent | $Ca^{++}$, p.p.m. |
|---|---|---|---|
| None | 12 | .295 | 42 |
| Steapsin | 25 | .290 | 43 |
| Calcium sulfate (0.5%) | 56 | .280 | 194 |
| Ammonium persulfate (2%) | 82 | .314 | 40 |
| Ca. sulfate (.5%)-Am. persulfate (2%) | 88 | .303 | 194 |
| Ca. sulfate (.25%)-steapsin-Am. persulfate (2%) | 194 | .341 | 419 |
| Ca. sulfate (.25%)-steapsin-Am. persulfate (1%) | 203 | .348 | 450 |
| Ca. sulfate (.25%)-steapsin-Am. persulfate (.5%) | 242 | .404 | 424 |

Table 5 also shows increase in the nitrogen and calcium content of the starch as a result of adding ammonium persulfate and a calcium salt, respectively, and shows the increase in such content when the starch has been altered by steapsin. The nitrogen increase is reported as percent protein.

It is to be understood that while the above described processes and products constitute preferred embodiments of our invention, these specific processes and products are for the purposes of illustration only, and that the invention is not limited to the precise forms disclosed, and various changes may be made therein without departing from the scope of the invention which is defined by the appended claims.

We claim:

1. In a composition possessing enhanced carbon dioxide generating properties comprising a carbohydrate and a suitable carbohydrate fermenting, carbon dioxide producing organism; said composition capable of yielding carbon dioxide as a result of the fermentation thereof; the improvement which comprises an effective amount of a lipase-altered starch to enhance the carbon dioxide generating properties of said composition, the lipase-altered starch being prepared from a substantially purified starch whose molecules have chemically bound constituents of atypical molecular fragments of lipid by bringing the starch and water in contact with a lipase under conditions effective to react with the atypical molecular fragments of lipid and alter the activity of the starch.

2. The improvement according to claim 1 wherein said starch is a steapsin-altered starch.

3. The improvement according to claim 1 wherein said composition is a sponge dough.

4. The improvement according to claim 1 wherein said composition is a bread dough.

5. The improvement according to claim 1 wherein said composition is a bread dough, said organism is a yeast, and said starch is a steapsin-altered starch.

6. The improvement according to claim 1 wherein said improved composition comprises a minor proportion of ammonium persulfate.

7. The composition according to claim 1 wherein the improved composition contains a minor proportion of a calcium salt.

8. The improvement according to claim 1 wherein said improved composition comprises a minor proportion of ammonium persulfate and a minor proportion of a calcium salt.

9. The improvement according to claim 1 wherein said composition is a bread dough, said organism is a yeast, said starch is steapsin-altered, and said improved composition comprises a minor proportion of ammonium persulfate and a minor proportion of a calcium salt.

10. In the method of fermenting a carbohydrate composition with a suitable carbohydrate fermenting carbon dioxide producing organism; the improvement which comprises mixing an effective amount of a lipase-altered starch with said composition to enhance the carbon dioxide generating properties thereof prior to the fermentation thereof.

11. The improvement according to claim 10 wherein said lipase is steapsin and the fermenting organism is yeast.

12. The improvement according to claim 10 wherein a minor proportion of ammonium persulfate is added prior to said fermentation.

13. The improvement according to claim 10 wherein a minor proportion of a calcium salt is added prior to said fermentation.

14. The method according to claim 10 wherein said composition is a bread dough, said organism is a yeast, the lipase-altered starch is steapsin-altered and there is added to the composition prior to the fermentation thereof a minor proportion of ammonium persulfate and a minor proportion of a calcium salt.

* * * * *

UNITED STATES PATENT OFFICE
CERTIFICATE OF CORRECTION

Patent No. 3,652,295          Dated  March 28, 1972

Inventor(s)  Saul Rogols and Robert L. High

It is certified that error appears in the above-identified patent and that said Letters Patent are hereby corrected as shown below:

Column 1, line 4, for "In a copending" read ---In copending---
Column 2, line 11, for "resulting was" read ---resulting mixture was---
Column 2, line 42, under Hours "1" for "·" read ---1---
Column 3, line 67, for "Wheat test starch 7 - 3%" read ---Wheat test starch 8 - 3%---

Signed and sealed this 26th day of September 1972.

(SEAL)
Attest:

EDWARD M. FLETCHER, JR.
Attesting Officer

ROBERT GOTTSCHALK
Commissioner of Patents